(12) United States Patent
Weber et al.

(10) Patent No.: US 7,980,995 B2
(45) Date of Patent: Jul. 19, 2011

(54) ELECTRO-HYDRAULIC CONTROL SYSTEM WITH MULTIPLEXED SOLENOID FOR RETARDER OPERATION AND MAIN PRESSURE MODULATION

(75) Inventors: Darren J. Weber, Indianapolis, IN (US); Charles F. Long, Pittsboro, IN (US); Jason L. Ellis, Clayton, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 973 days.

(21) Appl. No.: 11/856,752

(22) Filed: Sep. 18, 2007

(65) Prior Publication Data

US 2009/0071777 A1    Mar. 19, 2009

(51) Int. Cl.
*F16H 61/26* (2006.01)

(52) U.S. Cl. ...................................... 477/127; 475/116
(58) Field of Classification Search .................. 477/127, 477/130, 131; 475/116
See application file for complete search history.

(56) References Cited

U.S. PATENT DOCUMENTS

| | | | | |
|---|---|---|---|---|
| 3,863,739 | A | * | 2/1975 | Schaefer et al. ................ 477/60 |
| 4,881,625 | A | * | 11/1989 | Redelman ...................... 188/290 |
| 7,527,338 | B2 | * | 5/2009 | Long et al. ......................... 303/3 |
| 2007/0052288 | A1 | | 3/2007 | Long et al. |

* cited by examiner

*Primary Examiner* — Roger L Pang
*Assistant Examiner* — Derek D Knight
(74) *Attorney, Agent, or Firm* — Quinn Law Group, PLLC (57) ABSTRACT

An electro-hydraulic control system is provided that utilizes a shift solenoid and shift valve to multiplex a single pressure control solenoid to control both modulation of a main pressure regulator valve and retarder operation (fill and pressure).

10 Claims, 6 Drawing Sheets

FIG. 1

| Range | C1 | C2 | C3 | C4 | C5 | C6 |
|---|---|---|---|---|---|---|
| FWD 1 |  |  |  |  | x | x |
| FWD 2 | x |  |  |  | x |  |
| FWD 3 | x |  |  |  |  | x |
| FWD 4 | x |  |  | x |  |  |
| FWD 5 | x |  | x |  |  |  |
| FWD 6 | x | x |  |  |  |  |
| FWD 7 |  | x | x |  |  |  |
| FWD 8 |  | x |  | x |  |  |
| FWD 9 |  | x |  |  |  | x |
| REV 1 |  |  | x |  | x |  |
| Neutral |  |  |  |  | x |  |

| Range | Clutches Exhausted | SS1 N/L | SV1 | SV2 | SV3 | SV4 | PCS1 N/H | PCS2 N/H | PCS3 N/L | PCS4 N/L | PCS5 N/H | PCS6 N/L | TCC N/L |
|---|---|---|---|---|---|---|---|---|---|---|---|---|---|
| REV 1 | C1/C2 | 0 | 0 | 0 | 0 | 0 | -- | C3 | C5 A B | C4 | MM/Rtdr | C6 A B | TCC |
| Neutral | C1/C2 | 0 | 0 | 0 | 0 | 0 | -- | C3 | C5 A B | C4 | MM/Rtdr | C6 A B | TCC |
| FWD 1 | C2 | 1 | 1 | 0 | 0 | 1 | C1 | C3 | C5 A B | C4 | MM/Rtdr | C6 A B | TCC |
| ALT 2 | C2 | 1 | 1 | 0 | 0 | 0 | C1 | C3 | C5 A B | C4 | MM/Rtdr | C6 A B | TCC |
| FWD 2 | C2 | 0 | 1 | 0 | 0 | 0 | C1 | C3 | C5 A B | C4 | MM/Rtdr | C6 A B | TCC |
| FWD 3 | C2 | 0 | 1 | 0 | 1 | 1 | C1 | C3 | C5 A B | C4 | MM/Rtdr | C6 A B | TCC |
| FWD 4 | C2 | 0 | 1 | 0 | 1 | 0 | C1 | C3 | C5 A B | C4 | MM/Rtdr | C6 A B | TCC |
| ALT 4 | C5 A B | 1 | 1 | 1 | 1 | 0 | C1 | C2 | C3 | C4 | MM/Rtdr | C6 A B | TCC |
| FWD 5 | C5 A B | 1 | 1 | 1 | 0 | 0 | C1 | C2 | C3 | C4 | MM/Rtdr | C6 A B | TCC |
| FWD 6 | C5 A B | 1 | 1 | 1 | 0 | 0 | C1 | C2 | C3 | C4 | MM/Rtdr | C6 A B | TCC |
| FWD 7 | C5 A B | 1 | 1 | 1 | 0 | 0 | C1 | C2 | C3 | C4 | MM/Rtdr | C6 A B | TCC |
| ALT 8 | C5 A B | 1 | 1 | 1 | 0 | 0 | C1 | C2 | C3 | C4 | MM/Rtdr | C6 A B | TCC |
| FWD 8 | C1/C5 A B | 0 | 0 | 1 | 0 | 0 | C3 | C2 | -- | C4 | MM/Rtdr | C6 A B | TCC |
| FWD 9 | C1/C5 A B | 0 | 0 | 1 | 0 | 0 | C3 | C2 | -- | C4 | MM/Rtdr | C6 A B | TCC |

ELECTRO-HYDRAULIC CONTROL SYSTEM WITH MULTIPLEXED SOLENOID FOR RETARDER OPERATION AND MAIN PRESSURE MODULATION

TECHNICAL FIELD

The invention relates to an electro-hydraulic control system for a transmission with a retarder.

BACKGROUND OF THE INVENTION

Driveline retarders are used to apply braking torque to a vehicle transmission, especially in heavy-duty commercial vehicles when driving on a steep grade. For example, a hydraulic driveline retarder may use a rotary member connected to rotate with a transmission output shaft. The rotary member circulates fluid between vane members on a stationary housing surrounding the output shaft. The fluid circulation results in power absorption and the reduction in rotational speed of the output shaft. Various types of driveline retarders are well known. For example, a hydro-dynamic/hydraulic retarder circulates pressurized fluid within a rotor that is enclosed within a separate, vaned stationary housing in order to induce a viscous drag by way of an opposing fluid coupling effect, thus slowing a rotating drive shaft in proportion to the fluid pressure and/or flow, which is controlled by an electro-hydraulic control system based on vehicle operating conditions and/or operator input or request.

Typically, a single variable bleed solenoid is used to control both: (i) a retarder flow valve that permits pressurized fluid into the retarder cavity; and (ii) pressure in the retarder cavity. A separate variable bleed solenoid is used to modulate the main pressure of hydraulic fluid used to fill the retarder and for other transmission needs, such as the engagement of torque-transmitting clutches that establish a desired speed ratio through the transmission.

SUMMARY OF THE INVENTION

During retarder operation, it is desirable to maintain a full main pressure schedule to absorb additional driveline energy. Assuming the pump supplying main pressure is driven by driveline torque, such as by an engine powering the transmission, with a full main pressure schedule, the pump must work harder, thus absorbing more driveline torque. An electro-hydraulic control system is provided that utilizes a shift solenoid and shift valve to multiplex a single pressure control solenoid valve, which is preferably a variable bleed solenoid valve, to control both modulation of a main pressure regulator valve and retarder operation (fill and pressure). As used herein, a valve is "multiplexed" when it has more than one function, such as when it is able to at least partially control engagement of more than one torque-transmitting mechanism. In the electro-hydraulic control system provided, the main pressure regulator valve is always modulated for full main pressure (i.e., to permit the maximum main pressure) when the retarder is operating, but for variable line modulation when the retarder is not on. During "variable line modulation", a full (i.e., maximum) main pressure occurs when the pressure control solenoid is open to apply maximum control pressure to the main regulator valve. A minimum main pressure occurs when the pressure control solenoid is closed so that a minimum pressure is applied to the main regulator valve. Thus, "variable line modulation" occurs when the electronic controller continuously adjusts the pressure control solenoid valve to modulate the pressure applied to the main regulator valve based on engine torque transmitting through the transmission, resulting in a closed loop control condition of the main regulator valve and the main pressure provided thereby. Information on engine torque is provided via sensors and may be relayed from a separate engine control module to the electronic controller.

An electro-hydraulic control system is provided for a transmission that has a selectively operable retarder with a retarder flow valve. The retarder is operatively connected to a transmission output member. The electro-hydraulic control system has a main regulator valve for regulating main hydraulic pressure within the transmission. The system includes a selectively energizable shift solenoid that may be energized to achieve an "on" state and that is in an "off" state when not energized. A shift valve is operatively connected to the shift solenoid and moves between a first position when the shift solenoid is energized and a second position when the shift solenoid is not energized. The system also includes a pressure control solenoid valve that selectively permits control pressure fluid therethrough. The shift valve multiplexes the pressure control solenoid valve to modulate the main regulator valve (i.e., establishes variable line modulation) when the shift valve is in one of the first and second positions and to control fluid flow to the retarder flow valve when the shift valve is in the other of the first and second positions.

Preferably, a retarder regulator valve is in fluid communication with the shift valve and with fluid at main hydraulic pressure. The retarder regulator valve is not operable for regulating fluid pressure within the retarder when the pressure control solenoid is modulating the main regulator valve, but the shift valve permits the retarder regulator valve to regulate retarder pressure when the fluid pressure is provided to the retarder flow valve (i.e., when the retarder is operating).

In another aspect of the invention, an accumulator valve may be positioned to accumulate control pressure fluid provided to the main regulator valve through the shift valve.

By multiplexing one pressure control solenoid valve to modulate the main pressure regulator valve and to control pressurized fluid flow to the retarder, the number of required variable bleed-type solenoids is reduced relative to a typical electro-hydraulic control system that requires two different pressure control solenoids to accomplish these two functions. Thus, cost is decreased, along with complexity, electrical wiring and electronics within the electronic control unit. Control of retarder fill via an automatic flow valve is also made separate and distinct from control of the retarder pressure, which is modulated by the retarder regulator valve.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
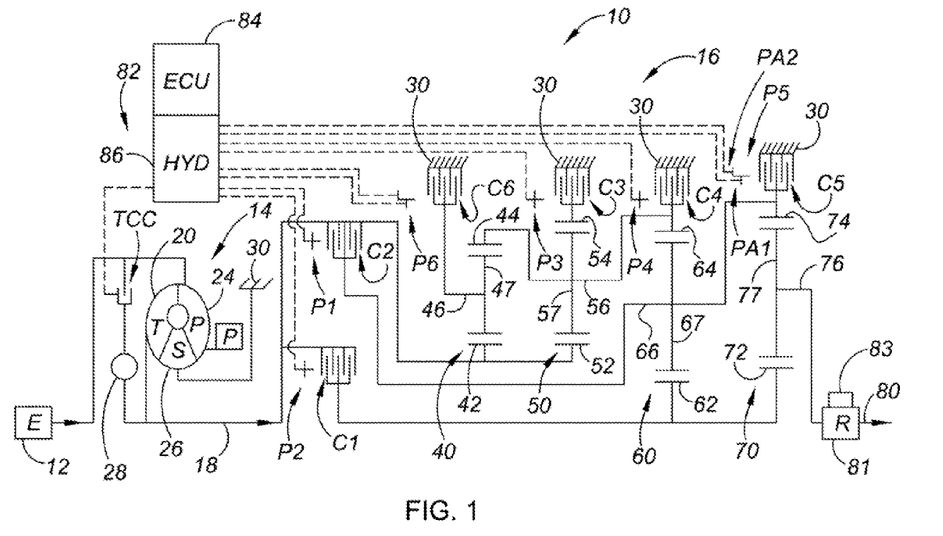
FIG. 1 is a schematic representation of a multi-speed transmission having torque-transmitting mechanisms engaged and disengaged via an electro-hydraulic control system within the scope of the invention, including a torque-transmitting mechanism engagable via a dual-area piston.

Referring to the drawings, wherein like reference numbers represent the same or corresponding parts throughout the several views, there is shown in FIG. 1 a powertrain 10. The powertrain 10 includes a power source or engine 12, a torque converter 14 and a multi-speed transmission 16. The torque converter 14 is connected with the engine 12 and with a transmission input member 18 via a turbine 20. Selective engagement of a torque converter clutch TCC allows the engine 12 to be directly connected with the input shaft 18, bypassing the torque converter 14. The input member 18 is typically a shaft, and may be referred to as an input shaft herein. The torque converter 14 includes the turbine 20, a pump 24 and a stator 26. The converter stator 26 is grounded to a casing 30 through a typical one-way clutch that is not shown. A damper 28 is operatively connected to the engaged torque converter clutch TCC for absorbing vibration.

The transmission 16 includes a first planetary gear set 40, a second planetary gear set 50, a third planetary gear set 60, and a fourth planetary gear set 70. The first planetary gear set includes a sun gear member 42, a ring gear member 44, and a carrier member 46 rotatably supporting a plurality of pinion gears 47 that intermesh with both the ring gear member 44 and the sun gear member 42. The second planetary gear set 50 includes a sun gear member 52, a ring gear member 54, and a carrier member 56 rotatably supporting a plurality of pinion gears 57 that intermesh with both the ring gear member 54 and the sun gear member 52. The third planetary gear set 60 includes a sun gear member 62, a ring gear member 64, and a carrier member 66 rotatably supporting a plurality of pinion gears 67 that intermesh with both the ring gear member 64 and the sun gear member 62. The fourth planetary gear set 70 includes a sun gear member 72, a ring gear member 74, and a carrier member 76 rotatably supporting a plurality of pinion gears 77 that intermesh with both the ring gear member 74 and the sun gear member 72.

The transmission 16 further includes a plurality of torque-transmitting mechanisms, including the torque converter clutch TCC, two rotating clutches: C1 and C2; and four stationary clutches C3, C4, C5 and C6. Torque is transferred from the input member 18 to an output member 80 along various powerflow paths through the transmission 16 depending on which of the plurality of selectively engagable torque-transmitting mechanisms are engaged. A retarder 81 is operatively connected to the output shaft 80 and is controllable to slow the output shaft 80 during certain vehicle operating conditions. The retarder 81 may be any of the many types known to those skilled in the art. A retarder flow valve 83 controls the flow of fluid into a cavity within the retarder 81. Additional fluid within the cavity further slows the output shaft 80.

The input member 18 is continuously connected for common rotation with sun gear members 42 and 52. The output member 80 is continuously connected for common rotation with carrier member 76. C1 is selectively engagable to connect the input member 18 for common rotation with sun gear members 62 and 72. C2 is selectively engagable to connect the input member 18 for common rotation with carrier member 66 and ring gear member 74. C3 is selectively engagable to ground ring gear member 54 to the transmission casing 30. C4 is selectively engagable to ground ring gear member 64, carrier member 56 and ring gear member 44 to the transmission casing 30. C5 is selectively engagable to ground ring gear member 74 and carrier member 66 to the transmission casing 30. C6 is selectively engagable to ground carrier member 46 to the transmission casing 30.

Figure 3A:
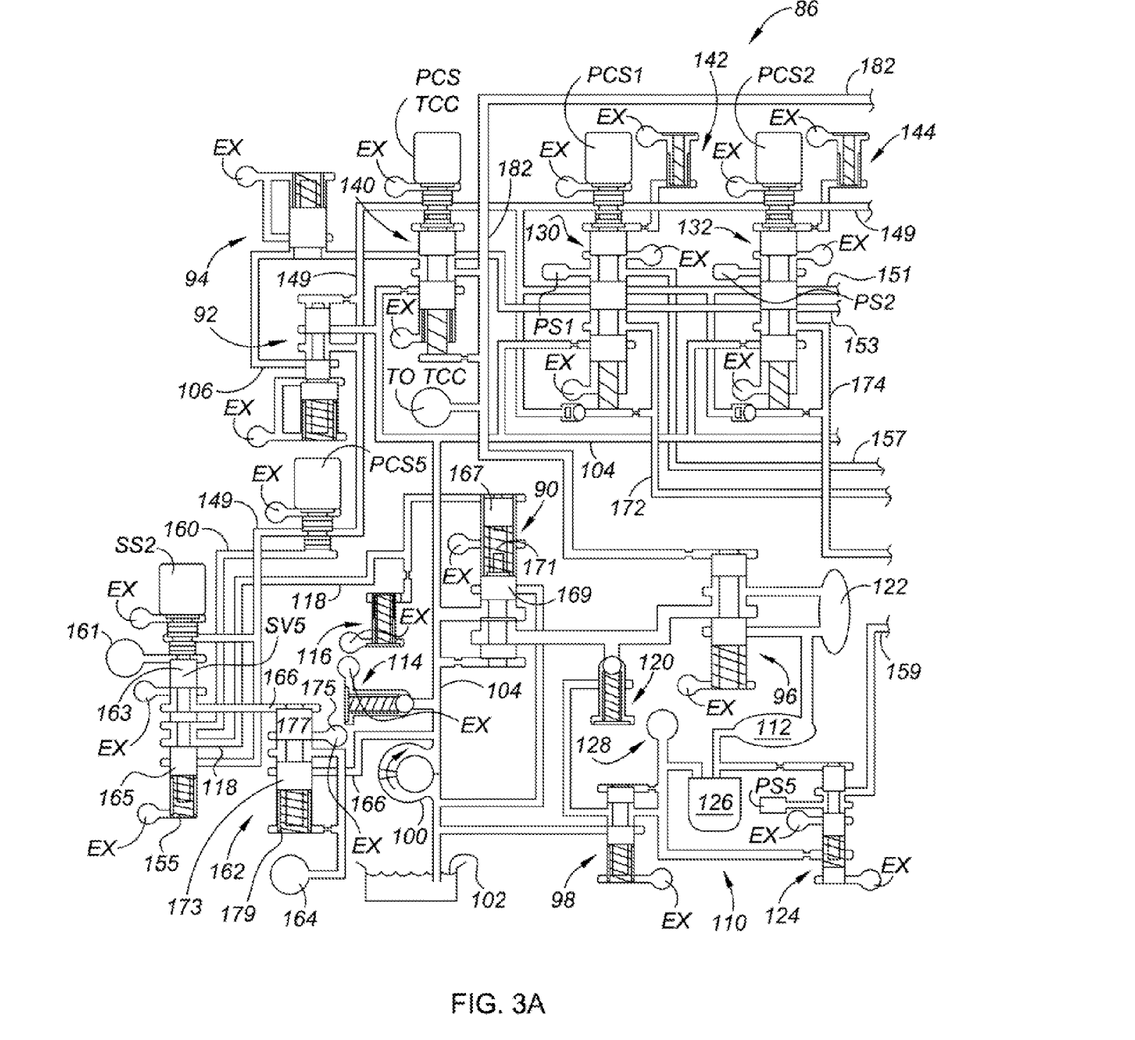
FIGS. 3A and 3B are a schematic representation of a hydraulic control portion of the electro-hydraulic control system of FIG. 1 having valves to control engagement and disengagement of the torque-transmitting mechanisms of FIG. 1.
Figure 3B:
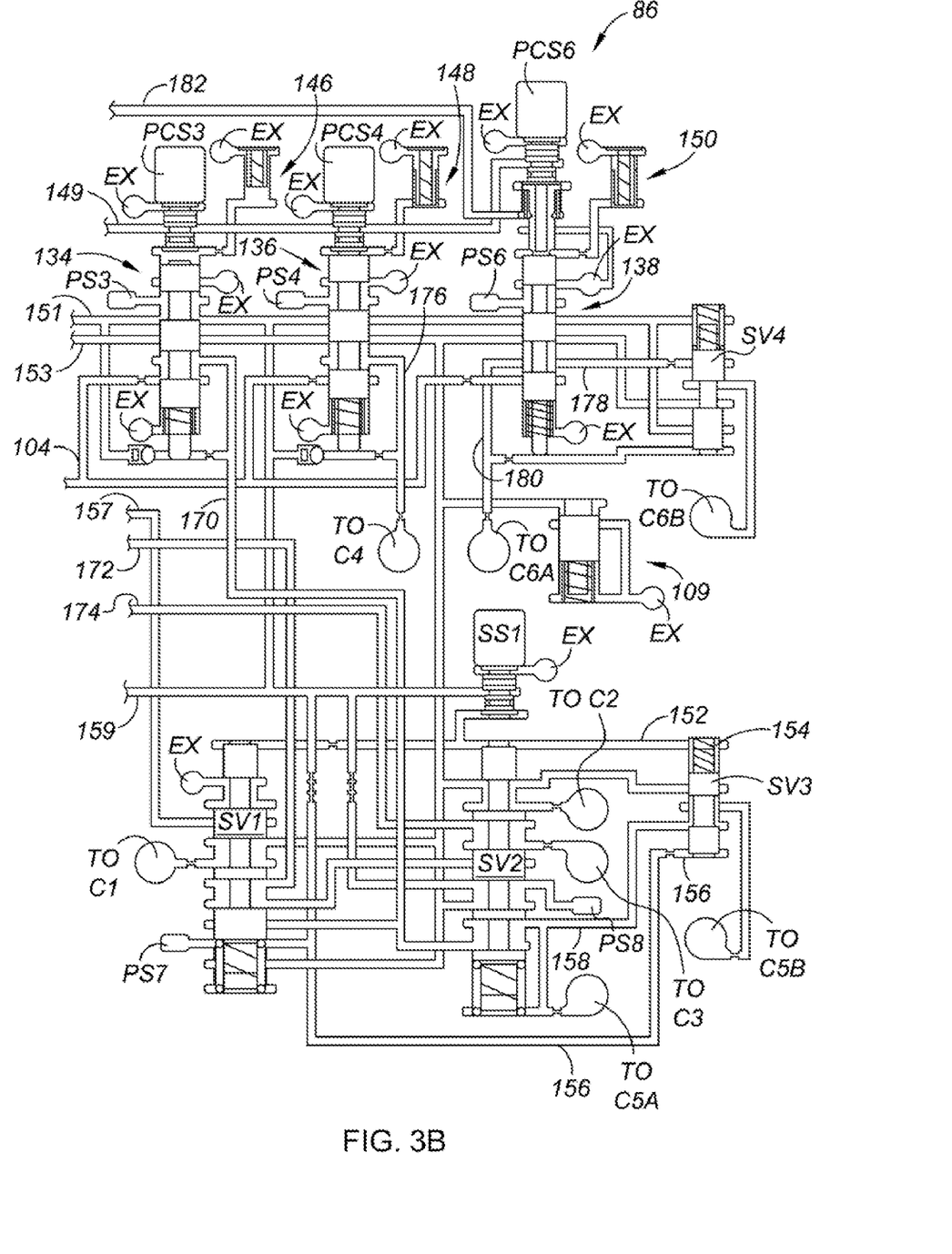

The selective engagement and disengagement of the torque-transmitting mechanisms is controlled by an electro-hydraulic control system 82, which is shown in further detail in FIGS. 3A and 3B. The electro-hydraulic control system 82 includes an electronic controller 84, which may be one or more control units and is referred to as ECU in FIG. 1, as well as a hydraulic control portion 86 referred to as HYD in FIG. 1. The electronic controller 84 is programmable to provide electrical control signals to the hydraulic control portion 86 to establish the fluid pressures that control engagement and disengagement of the torque-transmitting mechanisms TCC, C1, C2, C3, C4, C5 and C6. The hydraulic control portion 86 is operatively connected to each of the torque-transmitting mechanisms TCC, C1, C2, C3, C4, C5 and C6 by a fluid connection illustrated only schematically as dashed lines in FIG. 1 and in more detail as various passages, solenoids and valves shown in FIGS. 3A and 3B. The hydraulic control portion 86 provides pressurized fluid to apply pistons that apply pressure to the torque-transmitting mechanisms to cause frictional engagement of friction and reaction plates of the torque-transmitting mechanisms to establish the desired operative connections.

Figure 2:
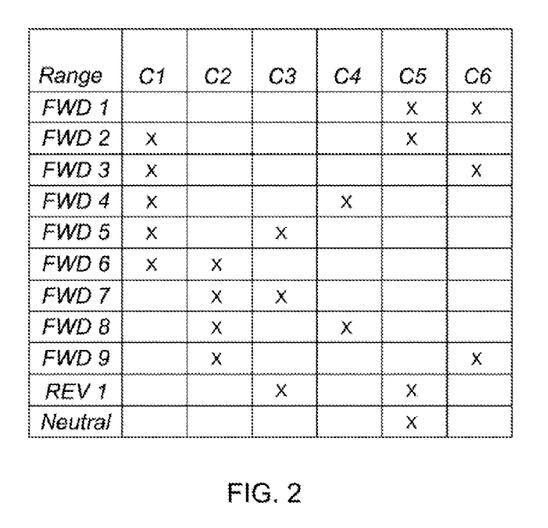
FIG. 2 is a chart showing an engagement schedule of the torque-transmitting mechanisms of the transmission of FIG. 1.

Referring to FIG. 2, an engagement schedule indicates with an "X" each of the torque-transmitting mechanisms C1, C2, C3, C4, C5 and C6 that are engaged to establish each of nine forward speed ratios FWD1, FWD2, FWD3, FWD4, FWD5, FWD6, FWD7, FWD8, and FWD9, as well as a Neutral mode and a reverse speed ratio REV1.

Referring again to FIG. 1, single-area apply pistons P1, P2, P3 and P4 are in fluid communication with the pressurized fluid supplied by the hydraulic control portion 86 to engage the torque-transmitting mechanisms C1, C2, C3, and C4 according to the engagement schedule of FIG. 2. A single-area apply piston has only one effective surface area to which fluid pressure is applied to cause engagement of the adjacent torque-transmitting mechanism. Assuming a constant apply pressure, torque-transmitting mechanisms engaged by a single-area piston have a single clutch capacity (i.e., torque capacity). Dual-area apply pistons P5 and P6 are used to engage torque-transmitting mechanisms C5 and C6, respectively. The dual-area apply piston P5 has two piston areas, a first piston area PA1, and a second piston area PA2, each with a fill cavity to which pressurized fluid may be separately routed by the hydraulic control portion 86 so that the apply piston P5 is applied with less force when pressurized fluid is supplied to only one of the piston areas PA1 or PA2, and with greater force when pressurized fluid is supplied to both of the piston areas PA1 and PA2. As is apparent in FIG. 2, torque-transmitting mechanism C5 is engaged in the first forward speed ratio FWD1 and the reverse speed ratio REV1. In those speed ratios, more torque is required at the output member 80, and thus greater clutch capacity is required by torque-transmitting mechanism C5. However, in the second forward speed ratio FWD2, the torque required is significantly less. By supplying pressurized fluid to only the first piston area PA1, hydraulic energy requirements are minimized. A dual-area piston P6 is also supplied to engage torque-transmitting mechanism C6 with pressurized fluid supplied to both a first piston area and a second piston area in the first forward speed ratio FWD1, and applied to only the first piston area in the ninth forward speed ratio FWD9, as far greater clutch capacity is required in the first forward speed ratio FWD1 than in the ninth forward speed ratio FWD9. Various types of dual-area pistons are known to those skilled in the art of transmission design, and any dual-area piston may be used for pistons P5 and P6.

Together, FIGS. 3A and 3B represent the complete hydraulic control portion 86, with the fragmented portions in each Figure connecting at like-numbered passages, from top to bottom, passages 104, 182, 149, 151, 153, 157, 172, 174 and 159. The hydraulic control portion 86 includes a main regulator valve 90, a control regulator valve 92, two EBF (exhaust back flow) regulator valves 94 and 109, a converter flow valve 96, and a lube regulator valve 98. The main regulator valve 90 is in fluid communication with a hydraulic pump 100 that draws fluid from a reservoir 102 for delivery to a main passage 104. The pump 100 and reservoir 102 constitute a main pressure source of pressurized fluid at a pressure referred to herein as "main pressure" or "line pressure". The control regulator valve 92 is in fluid communication with the main regulator valve 90, and establishes a reduced control pressure within passage 149, which may then be communicated to other valves as described below. The EBF regulator valve 94 is operable to vent fluid within passage 106 to exhaust should an over pressurized condition occur, and the EBF regulator valve 109 is operable to vent fluid within passage 153 should an overpressurized condition occur. Pump 100 is an engine-driven pump that draws fluid from reservoir 102 that is ultimately used to engage the torque-transmitting mechanisms of FIG. 1, to pressurize the valves of FIGS. 3A and 3B, to provide lubrication pressure to a lubrication system 110 and cooling fluid to a transmission cooling system 112.

A relief valve 114 is provided for the main pressure passage 104. A main regulator control passage accumulator 116 is provided to accumulate control pressure fluid in passage 118 when fluid at such pressure is provided to that passage. A converter relief valve 120 is provided for pressure at the converter flow valve 96 to the torque converter feed 122. A filter regulator valve 124 controls pressure through a filter 126 for the lubrication fluid provided to lubrication feed 128.

The hydraulic control portion 86 includes many pressure control solenoid valves, such as variable pressure-type solenoid valves PCS1, PCS2, PCS3, PCS4, PCS5, PCS6, and TCC, and shift-type (i.e., on/off type) solenoid valves SS1 and SS2. Each solenoid valve is in electric signal communication with the electronic controller 84 and is actuated upon receipt of a control signal therefrom. The solenoid valves PCS1, PCS2 and PCS5 are normally high or normally open-type solenoid valves, while the remaining solenoid valves PCS3, PCS4, PCS6, TCC, SS1 and SS2 are normally low or normally closed-type solenoid valves. As is well known, an open solenoid valve will distribute output pressure in the absence of an electrical signal to the solenoid. As used herein, a normally high-type solenoid is energized by a control signal to be placed in and to remain in a closed position (to prevent fluid flow therethrough), while a normally low-type valve is energized to be placed in and to remain in an open position (to allow fluid flow therethrough). The variable pressure-type solenoid valves are chosen as normally high-type or normally-low type so that, should a power failure occur and the electronic controller 84 is unable to energize the valves, the variable pressure-type solenoid valves, along with the trim valves, logic valves and shift valves will "fail" to positions that establish a predetermined, favorable one of the available speed ratios. For example, if a power failure occurs when the transmission 16 is operating in reverse REV1 or neutral, the valves will be positioned to establish the neutral state. If a power failure occurs while the transmission 16 is operating in any of the first through fifth forward speed ratios, the valves will be positioned to establish the fifth forward speed ratio FWD5. If a power failure occurs during the sixth forward speed ratio FWD6, the valves will be positioned to establish the sixth forward speed ratio. If a power failure occurs during any of the seventh through ninth forward speed ratios FWD7-FWD9, the valves will be positioned to establish the seventh forward speed ratio FWD7.

The hydraulic control portion 86 also includes a plurality of trim valves 130, 132, 134, 136, 138 and 140. Trim valve 130, solenoid valve PCS1 and accumulator valve 142 are a first trim system that, as will be further explained below, is multiplexed to control engagement and disengagement of both clutch C1 and clutch C3. Trim valve 132, solenoid valve PCS2, and accumulator valve 144 are a second trim system that is multiplexed to control engagement and disengagement of both clutch C2 and C3. Trim valve 134, solenoid valve PCS3, and accumulator valve 146 are a third trim system that is multiplexed to control engagement and disengagement of both clutch C3 and C5. Trim valve 136, solenoid valve PCS4, and accumulator valve 148 are a fourth trim system that controls engagement of the clutch C4. Trim valve 138, solenoid valve PCS6, accumulator valve 150, and shift valve SV4 are a fifth trim system that controls engagement and disengagement of clutch C6, which is a clutch that has a dual-area apply piston. The trim valve 138, solenoid valve PCS6, accumulator valve 150, and shift valve SV4 interact to determine whether pressurized fluid is supplied only to fill cavity C6A, for applications of clutch C6 requiring less torque capacity (e.g., in the ninth forward speed ratio FWD9; see FIG. 5), or whether pressurized fluid is supplied to both fill cavities C6A and C6B, for applications of clutch C6 requiring greater torque capacity (e.g., in the first and third forward speed ratios, FWD1 and FWD3; see FIG. 5). Trim valve 140, solenoid valve PCS TCC, converter flow valve 96 and converter relief valve 120 are a sixth trim system that controls engagement of torque converter clutch TCC.

Solenoid valve SS1 and shift valve SV3 are a trim system that, along with a control pressure signal from passage 156, logic valve SV1, trim valve 134, solenoid valve PCS3 and accumulator valve 146, controls engagement and disengagement of clutch C5 and whether engagement is by fluid pressure supplied at a fill cavity C5A for the first piston area PA1, so that the clutch C5 is engaged with a lesser torque capacity, or by fluid pressure supplied to fill cavity C5A and to a fill cavity C5B for a the second piston area PA2 as well, so that the clutch C5 is engaged with a higher torque capacity. For each trim system, actuation of the associated solenoid valve causes actuation of the respective trim valve and clutch (or one of the respective clutches in the case of multiplexed trim valves). Solenoid valve PCS5 and the main regulator valve 90 control the main pressure level in main passage 104 from the pump 100.

The hydraulic control portion 86 further includes logic valve SV2, referred to herein as a first logic valve, and logic valve SV1, referred to herein as a second logic valve. Solenoid SS1 receives an electrical control signal from the electronic controller 84 to actuate or shift, thereby supplying fluid at control pressure from passage 159 to passage 152 at the heads of valves SV1 and SV2, acting against bias springs positioned at the other end of the respective valves SV1 and SV2 that bias the valves SV1 and SV2 upward against passage 152. As best viewed in FIG. 3B, when solenoid valve SS1 is energized, fluid at control pressure in passage 152 is also supplied to the end of valve SV3 to act with a bias spring 154 to force the head of the valve SV3 down against passage 156. Passage 156 is also filled with fluid at control pressure while SV1 is in the stroked position. As is clear from FIGS. 3A and 3B, the logic valves SV1 and SV2 are in fluid communication with the trim valves 130, 132 and 134 and the respective solenoid valves PCS1, PCS2 and PCS3; the energized or unenergized status of solenoid valves PCS1, PCS2 and PCS3 determines the positions of logic valves SV1 and SV2 and thus whether pressurized fluid is provided to fill cavities to engage torque-transmitting mechanisms C1, C2, C3 and the fill cavity for the first piston area PA1 for C5, referred to as C5A. The logic valves multiplex the respective trim valves by allowing pressure directed through the trim valve to be directed to different clutches depending on the position of the logic valve. For example, the logic valve SV2 multiplexes trim valve 134 as it directs fluid pressure to fill cavity C5A, and then the first piston area PA1 of clutch C5 when in the spring-set position, but directs the pressurized fluid to a fluid cavity at clutch C3 when in the pressure-set (stroked) position. (The fluid cavities for the various torque-transmitting mechanism are represented as ports in FIGS. 3A and 3B, and are labeled "to C2", to "C5A", etc.)

Figure 4:
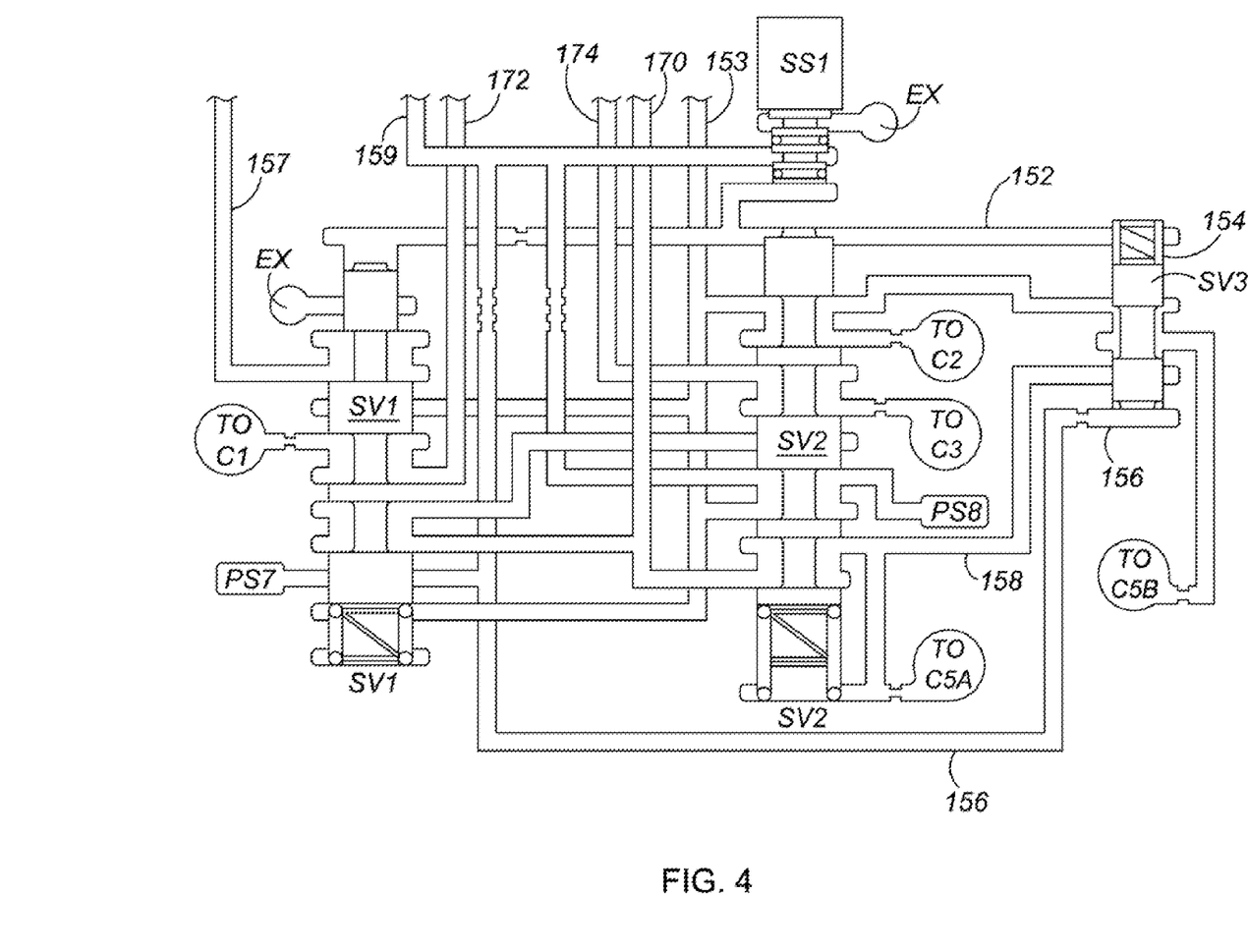
FIG. 4 is a schematic representation in fragmentary view of the hydraulic control portion shown in FIG. 3B.

When pressurized fluid is provided to fill cavity C5A, it may also be provided to the fill cavity for the second piston area PA2 of clutch C5, referred to as C5B, if the shift valve SV3 is in a spring-set, unstroked position, as shown in FIG. 3B. The position of shift valve SV3 is dependent upon various factors. First, if solenoid valve SS1 is energized, pressurized fluid is provided to passage 152 and acts with the spring 154 to keep the shift valve SV3 in an unstroked position. This is true regardless of whether pressurized fluid (at the control pressure) is in passage 156, as force of the control pressure fluid in passage 152 acting on the shift valve SV3 with the force of the spring 154 also acting on the shift valve SV3 will overcome the force of control pressure fluid in passage 152 acting on the shift valve SV3. If pressurized fluid is present in passage 156 but not in passage 152, the shift valve SV3 will be in the stroked position. Pressurized fluid will be present in passage 156 at all times pump 100 is on, unless the pressurized fluid is exhausted through passage 153. The pressurized fluid will exhaust through passage 153 when the logic valve SV1 is in the spring-set or unstroked position. However, if logic valve SV1 is in the pressure-set or stroked position, pressurized fluid in passage 156 cannot exhaust, as the lowest land of logic valve SV1 blocks flow from passage 156 to passage 153, as illustrated in FIG. 4. Logic valve SV1 will be in the stroked position if solenoid valve SS1 is energized. Even if solenoid valve SS1 is not energized, logic valve SV1 will be latched in the stroked position if control pressure fluid is provided in passage 157 while solenoid valve SS1 is still energized, prior to deenergizing solenoid valve SS1. Because the control pressure fluid would then act on different pressure responsive areas of the top two lands of logic valve SV1, with the lower of the two lands having a larger pressure responsive area, logic valve SV1 will be "latched" (i.e., retained in a specific position by fluid pressure) in a spring-set position and pressurized fluid in passage 156 will not be able to exhaust. This latching situation occurs in speed ratios FWD2, FWD3, FWD4, ALT4, FWD5, and FWD6, as those skilled in the art will be able to readily determine based on the information set forth in FIG. 5. Assuming control pressure fluid is present in passage 156, shift valve SV3 is in the spring-set position when solenoid valve SS1 is energized, as control pressure fluid is then applied to both ends of valve SV3. However, as best viewed in FIG. 4, when shift valve SV3 is not energized, the fluid in passage 152 is exhausted and the control pressure fluid present in passage 156 in forward speed ratios will stroke the valve SV3, moving it to the stroked position shown in FIG. 4, overcoming the bias of spring 154, and blocking the passage 158 so that pressurized fluid provided to fill cavity C5A cannot fill cavity C5B. Pressure switch PS7 is in fluid communication with the logic valve SV1 and is pressurized when logic valve SV1 is in the pressure-set position.

Figure 5:
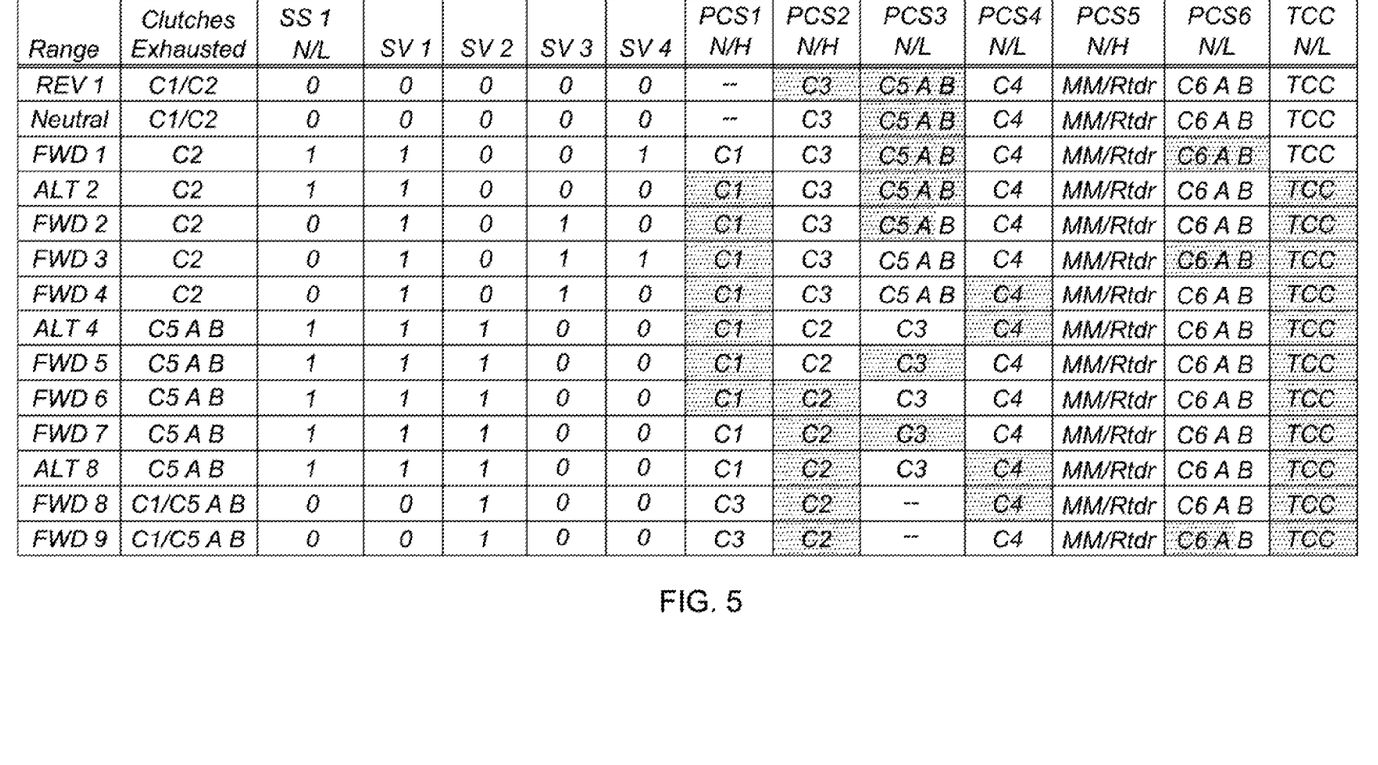
FIG. 5 is a table indicating the state of many of the valves shown in FIGS. 3A and 3B for each speed ratio of the transmission of FIG. 1.

Referring to FIG. 5, a table shows the steady-state conditions of the following valves during available speed ratios (also referred to as ranges): logic valves SV1 and SV2, switch valves SV3 and SV4, and pressure control solenoid valves PCS1, PCS2, PCS3, PCS4, PCS5, PCS6, PCS TCC and SS1. With respect to valves SS1, SV1, SV2, SV3, and SV4, an "0" in the chart indicates that the valve is in a spring-set position ("unstroked") and a "1" indicates that the valve is in a pressure-set position ("stroked"). Although not listed in the chart of FIG. 5, switch valve SV5 is in a pressure-set position in any of the speed ratios whenever vehicle operating conditions warrant application of the retarder 81 and, therefore, solenoid SS2 is energized. The speed ratios listed in FIG. 5 correspond with those of the engagement chart of FIG. 2, except optional alternate speed ratios ALT2, ALT 4 and ALT 8 are listed and may be used in lieu of speed ratios FWD2, FWD4 and FWD8.

With respect to the columns in FIG. 5 for the respective pressure control solenoid valves PCS1, PCS2, PCS3, PCS4, PCS6 and TCC, the clutch listed for a particular speed ratio in a column for a particular solenoid valve indicates that the state of the solenoid valve determines whether pressurized fluid is communicated to that clutch during that speed ratio. If the box listing the clutch is not shaded, then the solenoid is not energized in the case of a normally closed-type solenoid or is energized in the case of a normally open-type solenoid, and the listed clutch is not engaged during that speed ratio. If the box is shaded, then the solenoid is energized in the case of a normally closed-type solenoid or is not energized in the case of a normally-open type solenoid, and the listed clutch is thereby engaged during that speed ratio. The column of FIG. 5 labeled "Exhaust" indicates which of the clutches are being exhausted (emptied of pressurized fluid) during each of the various speed ratios.

The hydraulic control portion 86 is shown in the neutral state in FIGS. 3A and 3B. Normally-high pressure control solenoids PCS1 and PCS2 are energized to block flow of pressurized fluid therethrough. Pressure control solenoid PCS3 is energized, so that trim valve 134 is in a pressure-set position. The other trim valves 130, 132, 136, 138, 140, as well as the logic valves SV1 and SV2 and switch valves SV3, SV4 and SV5 are all shown in a spring-set position. It should be appreciated, that each of these valves has two steady-state positions. That is, if normally-low pressure control solenoid PCS3 is not energized, the trim valve 134 will slide upward from its position of FIG. 3B so that flow of main pressure fluid to passage 170 is blocked by the lowest land of valve 134. Similarly, if normally-high pressure control solenoid PCS1 is not energized, trim valve 130 will move downward from its spring-set position of FIG. 3A to a pressure set position in which flow of main pressure fluid is permitted from passage 104 to passage 172. If normally-high pressure control solenoid PCS2 is not energized, trim valve 132 will move downward from its spring-set position of FIG. 3A to a pressure-set position in which flow of main pressure fluid is permitted from passage 104 to passage 174. If normally-low pressure control solenoid PCS4 is energized, trim valve 136 will move downward from its spring-set position of FIG. 3A to a pressure-set position in which flow of main pressure fluid is permitted from passage 104 to passage 176. If normally-low pressure control solenoid PCS6 is energized, trim valve 138 will move downward from its spring-set position of FIG. 3A to a pressure-set position in which flow of main pressure fluid is permitted from passage 104 to passages 178 and 180. If normally-low pressure control solenoid PCS TCC is energized, trim valve 140 will move downward from its spring-set position of FIG. 3A to a pressure-set position in which flow of main pressure fluid is permitted from passage 104 to passage 182. If normally-high pressure control solenoid PCS5 is not energized, flow of control pressure fluid is permitted from passage 149 to passages 160 and 118. If shift solenoid SS2 is energized, shift valve SV5 will move downward from its spring-set position of FIG. 3A to a pressure set position in which flow of control pressure fluid is permitted from passage 149 to passage 118, and to feed passage 161. If shift solenoid SS1 is energized, control pressure fluid will be provided to passage 152. The effect on movement of shift valves SV1, SV2 and SV3 from the spring-set positions shown to pressure-set positions is described with respect to the dual-area piston fill cavities C5A and C5B.

Figure 6:
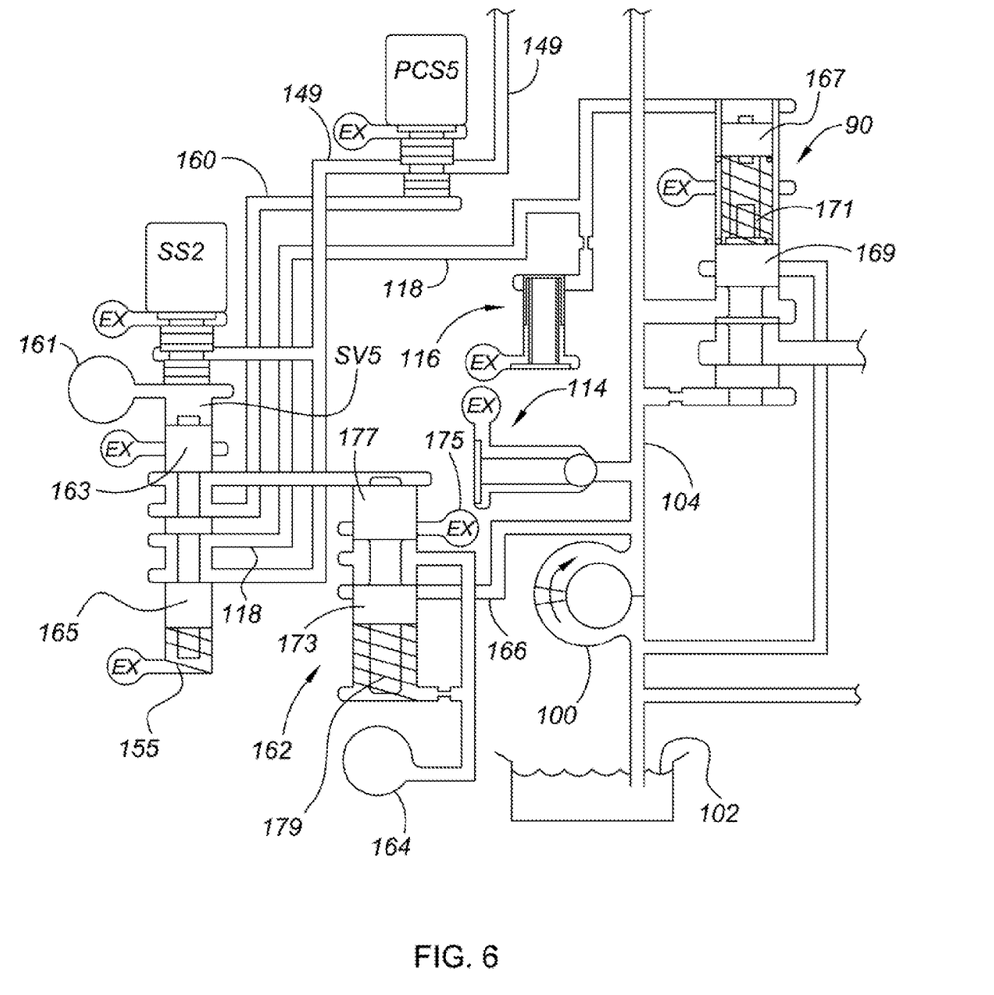
FIG. 6 is a schematic representation in fragmentary view of the hydraulic control portion shown in FIG. 3A.

With respect to pressure control solenoid PCS5, in FIG. 3A, "MM/Rtdr" indicates that the pressure control solenoid PCS5 may be energized as necessary to control an output pressure in passage 160 that controls a pressure bias on the main regulator valve 90. When pressure control solenoid PCS5 is not energized, as shown in FIG. 3A, fluid at control pressure established by the control pressure regulator valve 92 is provided to passage 160. By varying the pressure within passage 118, the pressure control solenoid PCS5 is operable to vary the operating characteristics of the main regulator valve 90, thereby modulating the pressure within the passage 104. The pressure control solenoid PCS5 and passage 160 are in communication with passage 118 through a shift valve SV5 that shifts between a spring-set position (shown in FIG. 3A) and a pressure-set position shown in FIG. 6, achieved when a solenoid valve SS2 is energized. The solenoid valve SS2 is energized during vehicle decelerations and other events when operation of the retarder 81 is desirable. When shift valve SV5 is in the pressure-set position of FIG. 6, control pressure is directed through feed passage 149 to feed passage 161 which feeds the retarder flow valve 83 of FIG. 1 that controls filling of the retarder 81 and thus on/off operation of the retarder 81. When shift valve SV5 is in the pressure-set position, spring 155 maintaining valve SV5 in the spring-set position is compressed, and the lands 163 and 165 move downward so that fluid from passage 149 is in communication with feed passage 161 and with passage 118. Control pressure is sent through valve SV5 to passage 118. Thus, control pressure is applied to the top land 167 of the main regulator valve 90, and the main regulator valve 90 has "full line modulation", which is desirable during retarder operation. That is, with control pressure applied at the top of land 167, additional pressure is placed on spool 169 via spring 171, resulting in "full line modulation" of the main regulator valve 90 and the main pressure. This prevents fluid at main pressure in passage 104 from communicating with the torque converter feed 122 and lubrication system 110, to better maintain full line pressure in passage 104, which is desirable during the same operating conditions that retarder operation is desirable, as additional driveline energy is used by the pump 100 to provide the higher pressure. When normally-high pressure control solenoid valve PCS5 is energized and normally-low solenoid valve SS2 is not energized as illustrated in FIG. 3A, the fluid in passages 160 and 118 is at a lower trim pressure, rather than at control pressure, and this lower pressure is provided to the top land 167. This results in "minimum line modulation" by the main regulator valve 90, as line pressure in passage 104 is more readily provided to the torque converter feed 122 and the lube system 110. The electronic controller 84 can continuously adjust the pressure control solenoid valve PCS5 to modulate pressure in passage 118 based on engine torque transmitting through the transmission 16, resulting in a closed loop control condition referred to herein as "variable line modulation" of the main regulator valve 90 and the main pressure. Information of engine torque is provided via sensors and may be relayed from a separate engine control module to the electronic controller 84.

The position of shift valve SV5 also affects the position of a retarder regulator valve 162 that functions to adjust the pressure within the retarder 81 of FIG. 1. When the retarder regulator valve 162 is in the spring-set position shown in FIG. 3A (i.e., biased by spring 179), feed passage 164 (which provides fluid to the retarder 81 to control pressure in the retarder cavity) exhausts through the exhaust port 175. When shift solenoid SS2 is energized and normally-high pressure control solenoid valve PCS5 is energized, valve SV5 is in the pressure-set position shown in FIG. 6, fluid at trim pressure is directed through passage 166 to move the retarder regulator valve 162 to a pressure-set position in which land 173 is moved downward against spring 179 and land 177 blocks exhaust port 175, to prevent fluid at main pressure fed to the retarder feed passage 164 from venting and thereby increasing pressure in the retarder 81.

As is apparent from the chart of FIG. 5, the pressure control solenoid PCS1 and the first trim system of which it is a part is multiplexed to control the engagement and disengagement of both clutches C1 and C3. The pressure control solenoid PCS2 and the second trim system of which it is a part is multiplexed to control the engagement and disengagement of both clutches C2 and C3. The pressure control solenoid PCS3 and the third trim system of which it is a part is multiplexed to control the engagement and disengagement of both clutches C3 and C5. Pressure control solenoid PCS4 controls the engagement of the clutch C4. Pressure control solenoid PCS5 controls the pressure through passage 118 to the main regulator valve 90, as discussed above, to determine whether the main regulator valve 90 performs variable modulation of line pressure or full modulation of line pressure. Pressure control solenoid PCS6 controls the engagement of clutch C6. Pressure control solenoid PCS TCC controls the engagement of the torque converter clutch TCC shown in FIG. 1. The dashed lines in the chart of FIG. 5 indicate that the respective pressure control solenoid and trim system are decoupled from the respective clutch. The column labeled "Exhaust" indicates, for each speed ratio range, clutches that are being exhausted through the logic valves. The remaining clutches that are not engaged are exhausted through the associated trim valves. Referring to FIGS. 3A and 3B, passages labeled "EX" indicate exhaust passages that allow pressurized fluid to exhaust, resulting in a non-pressurized state of passages and pressure switches in fluid communication with the exhaust passage.

Electrical signals are also sent to the electronic controller 84 based on fluid pressure in the hydraulic control portion 86 to provide feedback information such as information indicative of valve positions. The locations of various pressure switches which provide such feedback are indicated as pressure switches PS1, PS2, PS3, PS4, PS5, PS6, PS7 and PS8 in FIGS. 3A and 3B. Each pressure switch can monitor and report a high logic state and a low logic state, corresponding with a relatively high pressure and low pressure, respectively, of the fluid at the switch. The pressure switches are configured to report the high logic state at or above a predetermined pressure and the low logic state below the predetermined pressure. Accordingly, as used herein, a "relatively high pressure" is a pressure at or above a predetermined pressure and a "relatively low pressure" is a pressure below the predetermined pressure. The ability to monitor the above-mentioned valves and detect a change, or lack of change, in valve position is of importance to provide continuous and reliable operation of the transmission 16.

The pressure switches PS1, PS2, PS3, PS4, PS5, PS6, PS7, PS8, and the electronic controller 84 that analyses the state of the pressure switches form a diagnostic system for the transmission 16. Each pressure switch PS1, PS2, PS3, PS4, PS5, PS6, PS7 and PS8 is operatively connected with the controller 84 by a transfer conductor (e.g., an electrical wire) capable of carrying electrical signals therebetween. The controller 84 contains data representing the expected logic state of each of the pressure switches in each of the speed ratio ranges in which the transmission 16 operates. If one or more of the pressure switches detects and reports a logic state to the controller 84 that does not correspond to the expected logic state of that particular pressure switch in the particular speed ratio in which the transmission 16 is operating, the controller 84 will determine whether it is necessary to shift the transmission 16 to a different speed ratio range, including to one of the predetermined drive-home modes (also referred to as failure modes), discussed below, until the transmission 16 can be maintenanced.

Those skilled in the art will understand the various fluid pressures resulting in the passages shown in FIGS. 3A and 3B and the affect on the positions of the trim valves, shift valves and logic valves, based on the chart of FIG. 5. In the reverse speed ratio REV1, solenoids PCS1 and PCS3 are energized, and diagnostic pressure switches PS2, PS3 and PS5 report a high logic state. In the Neutral state, solenoids PCS1, PCS2, and PCS3 are energized and pressure switches PS3 and PS5 report a high logic state. In the first forward speed ratio FWD1, solenoids SS1, PCS1, PCS2, PCS3 and PCS6 are energized, and diagnostic pressure switches PS3, PS5, PS6 and PS7 report a high logic state. In the alternate second forward speed ratio ALT2, solenoids SS1, PC S2, PCS3 and PCS TCC are energized, and diagnostic pressure switches PS1, PS3, PS5 and PS7 report a high logic state. In the second forward speed ratio FWD2, solenoids PCS2, PCS3 and PCS TCC are energized, and diagnostic pressure switches PS1, PS3, PS5 and PS7 report a high logic state. In the third forward speed ratio FWD3, solenoids PCS2, PCS6 and PCS TCC are energized, and diagnostic pressure switches PS1, PS5, PS6 and PS7 report a high logic state. In the fourth forward speed ratio FWD4, solenoids PCS2, PCS4 and PCS TCC are energized, and diagnostic pressure switches PS1, PS4, PS5 and PS7 report a high logic state. In the alternate fourth forward speed ratio ALT4, solenoids SS1, PCS2, PCS4 and PCS TCC are energized, and diagnostic pressure switches PS1, PS4, PS5, PS7 and PS8 report a high logic state. In the fifth forward speed ratio FWD5, solenoids SS1, PCS2, PCS3 and PCS TCC are energized, and diagnostic pressure switches PS1, PS3, PS5, PS7 and PS8 report a high logic state. In the sixth forward speed ratio FWD6, solenoids SS1, and PCS TCC are energized, and diagnostic pressure switches PS1, PS2, PS5, PS7 and PS8 report a high logic state. In the seventh forward speed ratio FWD7, solenoids SS1, PCS1, PCS3 and PCS TCC are energized, and diagnostic pressure switches PS2, PS3, PS5, PS7 and PS8 report a high logic state. In the alternate eighth forward speed ratio ALT8, solenoids SS1, PCS1, PCS4 and PCS TCC are energized, and diagnostic pressure switches PS2, PS4, PS5, PS7 and PS8 report a high logic state. In the eighth forward speed ratio FWD8, solenoids PCS1, PCS4 and PCS TCC are energized, and diagnostic pressure switches PS2, PS4, PS5 and PS8 report a high logic state. In the ninth forward speed ratio FWD9, solenoids PCS1, PCS6 and PCS TCC are energized, and diagnostic pressure switches PS2, PS5, PS6 and PS8 report a high logic state.

While the best modes for carrying out the invention have been described in detail, those familiar with the art to which this invention relates will recognize various alternative designs and embodiments for practicing the invention within the scope of the appended claims.

The invention claimed is:

1. An electro-hydraulic control system for a transmission with a selectively operable retarder operatively connected to a transmission output member, with a retarder flow valve controlling the flow of fluid into the retarder, and with a main regulator valve for regulating main hydraulic pressure within the transmission, comprising:
   a selectively energizable shift solenoid;
   a shift valve operatively connected to the shift solenoid and movable between a first position when the shift solenoid is energized and a second position when the shift solenoid is not energized; and
   a pressure control solenoid valve selectively permitting control pressure fluid therethrough; wherein the shift valve multiplexes the pressure control solenoid valve to variably modulate the main regulator valve when the shift valve is in one of the first and the second positions and to permit fluid flow to the retarder flow valve when the shift valve is in the other of the first and second positions.

2. The electro-hydraulic control system of claim 1, further comprising:
   a retarder regulator valve in fluid communication with the shift valve and with fluid at main hydraulic pressure and operable for regulating fluid pressure within the retarder when the shift valve is in said other of said first and second positions.

3. The electro-hydraulic control system of claim 1, further comprising:
   an accumulator valve positioned to accumulate control pressure fluid provided to the main regulator valve through the shift valve.

4. An electro-hydraulic control system for a transmission with a selectively operable retarder operatively connected to a transmission output member; including a main regulator valve for controlling main hydraulic pressure within the transmission; a retarder regulator valve for controlling fluid pressure in the retarder; and a control pressure regulator valve establishing fluid at a control pressure within the transmission, comprising:
   a pressure control solenoid valve selectively permitting fluid at the control pressure therethrough;
   a shift solenoid valve selectively energizable to permit fluid at the control pressure therethrough into communication with the retarder to fill the retarder;
   a shift valve selectively movable from a first position to a second position in response to energizing of the shift solenoid valve; wherein the shift valve multiplexes the pressure control solenoid to control operation of the main regulator valve when in the first position and to control operation of the retarder regulator valve when in the second position.

5. The electro-hydraulic control system of claim 4, further comprising:

an accumulator valve positioned to accumulate control pressure fluid provided to the main regulator valve through the shift valve.

6. The electro-hydraulic control system of claim 5, further comprising:
a first spring biasing the shift valve to the first position; and
a second spring biasing the retarder regulator valve to a closed position in which fluid at main pressure is not provided to the retarder through the retarder regulator valve.

7. An electro-hydraulic control system for a transmission with a selectively operable retarder operatively connected to a transmission output member, with a retarder flow valve controlling the flow of fluid into the retarder, comprising:
a source of main pressure;
a main regulator valve operable for regulating the main pressure provided by the source;
a control pressure regulator valve operable for establishing a control pressure based on the main pressure;
a selectively energizable pressure control solenoid valve in fluid communication with the control pressure regulator valve to receive fluid at the control pressure therefrom;
a selectively energizable shift solenoid valve in fluid communication with the control pressure regulator valve to receive fluid at control pressure therefrom;
a shift valve operatively connected with the shift solenoid valve and movable from a first position to a second position when the shift solenoid valve is energized;
wherein the shift solenoid valve, when energized, establishes communication of fluid at the control pressure both with the retarder to operate the retarder flow valve and with the main regulator valve so that the main regulator valve permits full main pressure; and
wherein the pressure control solenoid valve establishes communication of fluid through the shift valve to the main regulator valve to modulate main pressure when the shift solenoid valve is not energized and therefore the retarder is not operating.

8. The electro-hydraulic control system of claim 7, further comprising:
a retarder regulator valve operable for regulating fluid pressure within the retarder; and wherein the pressure control solenoid valve controls the retarder regulator valve when the shift solenoid is energized.

9. The electro-hydraulic control system of claim 7, further comprising:
an accumulator valve positioned to accumulate control pressure fluid provided to the main regulator valve through the shift valve.

10. The electro-hydraulic control system of claim 7, further comprising:
a spring biasing the shift valve to the first position.

* * * * *